US012676071B2

(12) United States Patent
He et al.

(10) Patent No.: US 12,676,071 B2
(45) Date of Patent: Jul. 7, 2026

(54) METHOD AND SYSTEM FOR DETERMINING OPTIMAL FLIGHT HEIGHT OF UNMANNED AERIAL VEHICLE, ELECTRONIC DEVICE, AND MEDIUM

(71) Applicants: Hainan Institute of Zhejiang University, Sanya City (CN); Zhejiang University, Zhejiang (CN)

(72) Inventors: Yong He, Sanya (CN); Xiaoyue Du, Sanya (CN); Liyuan Zheng, Sanya (CN); Liwen He, Sanya (CN); Shuiguang Deng, Sanya (CN); Chongde Sun, Sanya (CN)

(73) Assignees: Hainan Institute of Zhejiang University, Sanya City (CN); Zhejiang University, Zhejiang (CN)

( * ) Notice: Subject to any disclaimer, the term of this patent is extended or adjusted under 35 U.S.C. 154(b) by 402 days.

(21) Appl. No.: 18/352,669

(22) Filed: Jul. 14, 2023

(65) Prior Publication Data

US 2024/0038074 A1 Feb. 1, 2024

(30) Foreign Application Priority Data

Jul. 28, 2022 (CN) .......................... 202210894571.9

(51) Int. Cl.
*G08G 5/30* (2025.01)
*G06V 20/10* (2022.01)
*G06V 20/17* (2022.01)

(52) U.S. Cl.
CPC .............. *G08G 5/30* (2025.01); *G06V 20/17* (2022.01); *G06V 20/194* (2022.01)

(58) Field of Classification Search
CPC ........ G08G 5/30; G06V 20/17; G06V 20/194; G05D 1/101
See application file for complete search history.

(56) References Cited

PUBLICATIONS

Agricultural drones best practices by LiDARNews Pub Jul. 3, 2022 (Year: 2022).*
Apparent Reflectance Funciton, Pub ArcGIS Desktop, Acq 2025 (Year: 2025).*

(Continued)

*Primary Examiner* — Gregory A Morse
*Assistant Examiner* — Ty Mitchell Beatty
(74) *Attorney, Agent, or Firm* — Rosenthal IP Law; Lawrence Rosenthal

(57) ABSTRACT

The present disclosure provides a method and system for determining an optimal flight height of an unmanned aerial vehicle (UAV), an electronic device, and a medium. The method includes: obtaining a multi-band crop spectral image of an experimental area in a preset scenario; performing data processing on the multi-band crop spectral image, to obtain multi-spectral orthographies of a plurality of sample plots; calculating a ground resolution of the multi-spectral orthography of each sample plot, simulating and determining a multi-band crop spectral image of each sample plot at a different flight height by a nearest neighbor interpolation method based on the ground resolution of the multi-spectral orthography of each sample plot; and for the multi-band crop spectral image of each sample plot at the different flight height, determining an optimal flight height corresponding to each sample plot by a hypothetical test method.

7 Claims, 3 Drawing Sheets

Obtain a multi-band crop spectral image of an experimental area in a preset scenario — 100

Perform data processing on the multi-band crop spectral image, to obtain multi-spectral orthographies of a plurality of sample plots — 200

Calculate a ground resolution of the multi-spectral orthography of each sample plot, simulate and determine a multi-band crop spectral image of each sample plot at a different flight height by a nearest neighbor interpolation method based on the ground resolution of the multi-spectral orthography of each sample plot — 300

For the multi-band crop spectral image of each sample plot at the different flight height, determine an optimal flight height corresponding to each sample plot by a hypothetical test method — 400

(56)     References Cited

PUBLICATIONS

Assessment of optimal flying height by Awais Pub IJEST Feb. 21, 2021 (Year: 2021).*

Imaging system for agricultural remote sensing by Yang, Pub ELSEVIER Jul. 4, 2012 (Year: 2012).*

Optimising drone flight planning by Tu, Pub EISEVIER, Dec. 18, 2019 (Year: 2019).*

In Situ UAV Multispectral Images by Zhang, Pub MDPI Apr. 8, 2020 (Year: 2020).*

Wikipedia article on Ground Sample Distance, Acq. 2025 (Year: 2025).*

* cited by examiner

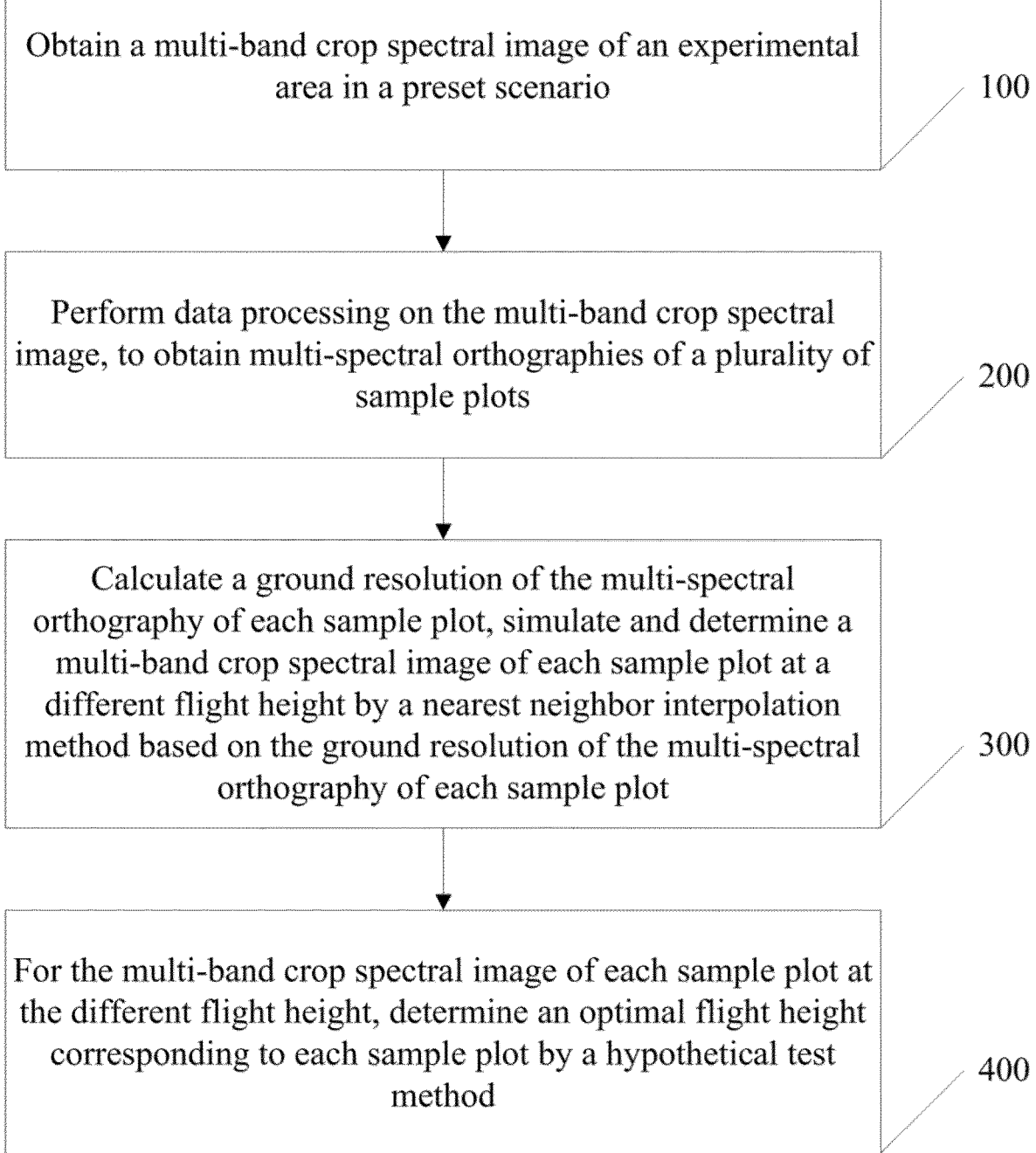

Obtain a multi-band crop spectral image of an experimental area in a preset scenario — 100

Perform data processing on the multi-band crop spectral image, to obtain multi-spectral orthographies of a plurality of sample plots — 200

Calculate a ground resolution of the multi-spectral orthography of each sample plot, simulate and determine a multi-band crop spectral image of each sample plot at a different flight height by a nearest neighbor interpolation method based on the ground resolution of the multi-spectral orthography of each sample plot — 300

For the multi-band crop spectral image of each sample plot at the different flight height, determine an optimal flight height corresponding to each sample plot by a hypothetical test method — 400

METHOD AND SYSTEM FOR DETERMINING OPTIMAL FLIGHT HEIGHT OF UNMANNED AERIAL VEHICLE, ELECTRONIC DEVICE, AND MEDIUM

CROSS REFERENCE TO RELATED APPLICATION

This patent application claims the benefit and priority of Chinese Patent Application No. 2022108945719, filed with the China National Intellectual Property Administration on Jul. 28, 2022, the disclosure of which is incorporated by reference herein in its entirety as part of the present application.

TECHNICAL FIELD

The present disclosure relates to the field of unmanned aerial vehicle (UAV) low-altitude remote sensing technologies, and in particular, to a method and system for determining an optimal flight height of a UAV, an electronic device, and a medium.

BACKGROUND

The UAV low-altitude remote sensing is an important means to monitor growth and physiological conditions of farmland crops. However, under conditions that a sensor carried by a UAV and a shooting parameter remain unchanged, a ground resolution has a great influence on phenotypic analysis such as a canopy temperature, ground coverage, a vegetation index, and a plant disease. In this process, calculation of the ground resolution is closely related to a flight height. While the flight height is higher, a ground resolution of an obtained image is lower. To obtain an image of a field plot with a high ground resolution, the flight height is bounded to be reduced. For plots with a same size, if the flight height is reduced, flight time becomes longer. This increases the flight time and experimental costs of a UAV platform. On the contrary, if the flight height is higher, flight efficiency is improved. However, the ground resolution is reduced, and in addition, mixed pixel effect of the image is aggravated. This affects accuracy of phenotypic analysis of later data. Therefore, how to balance a relationship between the flight height of the UAV and the ground resolution and obtain an image that meets a requirement for phenotypic parameter extraction accuracy needs to be discussed and resolved.

SUMMARY

In view of this, an objective of the present disclosure is to provide a method and system for determining an optimal flight height of a UAV, an electronic device, and a medium, to determine an optimal flight height based on a relationship between a flight height of the UAV and ground resolution, and lay a foundation for obtaining a crop spectral image that meets a requirement for phenotypic parameter extraction accuracy.

To achieve the above objective, the present disclosure provides the following technical solutions:

According to a first aspect, the present disclosure provides a method for determining an optimal flight height of a UAV. The method includes:

obtaining a multi-band crop spectral image of an experimental area in a preset scenario, where the preset scenario is a scenario in which flight parameters of the UAV and setting parameters of a spectral camera are unchanged in a flight process of the UAV carrying the spectral camera;

performing data processing on the multi-band crop spectral image, to obtain multi-spectral orthographies of a plurality of sample plots, where the experimental area includes the plurality of sample plots;

calculating a ground resolution of the multi-spectral orthography of each sample plot, simulating and determining a multi-band crop spectral image of each sample plot at a different flight height by a nearest neighbor interpolation method based on the ground resolution of the multi-spectral orthography of each sample plot; and for the multi-band crop spectral image of each sample plot at the different flight height, determining an optimal flight height corresponding to each sample plot by a hypothetical test method.

Optionally, according to the first aspect, the method further includes:

determining an optimal flight path corresponding to the experimental area based on the optimal flight height corresponding to each sample plot; and controlling the UAV to fly based on the optimal flight path, to obtain a multi-band crop spectral image that meets a requirement for phenotypic parameter extraction accuracy.

Optionally, the performing data processing on the multi-band crop spectral image, to obtain multi-spectral orthographies of a plurality of sample plots specifically includes:

performing, by using Agisoft Photoscan software, image splicing on a multi-band crop spectral image of the experimental area collected by the spectral camera, to obtain the multi-spectral orthography;

performing spectral correction and reflectivity correction on the multi-spectral orthography by using MATLAB software, to obtain a corrected multi-spectral orthography; and performing image segmentation on the corrected multi-spectral orthography, to obtain the multi-spectral orthographies of the sample plots.

Optionally, a plurality of multi-band crop spectral images corresponding to any sample plot are divided into different flight gradients based on a flight height. For the multi-band crop spectral image of each sample plot at the different flight height, the determining an optimal flight height corresponding to each sample plot by a hypothetical test method specifically includes:

for any sample plot, performing at least one hypothetical test operation based on a flight gradient from low to high until that a preset condition is met, where two hypothetical test operations correspond to the different flight gradients, an $i^{th}$ hypothetical test operation corresponds to an $i^{th}$ flight gradient, i is greater than or equal to 1 and less than or equal to N, and N is a total number of flight gradients;

the $i^{th}$ hypothetical test operation includes:

performing the hypothetical test on a multi-band crop spectral image of a marked sample plot at the $i^{th}$ flight gradient, and determining a hypothetical test result corresponding to the marked sample plot at the $i^{th}$ flight gradient, where the marked sample plot is any sample plot; and when the hypothetical test result is less than or equal to a preset threshold, determining a flight height corresponding to an $(i-1)^{th}$ flight gradient as an optimal flight height of the marked sample plot;

where, the preset condition includes that the hypothetical test result is less than or equal to the preset threshold.

Optionally, the determining a hypothetical test result corresponding to the marked sample plot at the $i^{th}$ flight gradient specifically includes:

determining a mean reflectivity spectrum of a first target, where the mean reflectivity spectrum of the first target is a mean reflectivity spectrum of multi-band crop spectral images of marked sample plots at the $i^{th}$ flight gradient;

determining a mean reflectivity spectrum of a second target, where the mean reflectivity spectrum of the second target is a mean reflectivity spectrum of the multi-band crop spectral images of the marked sample plot when the UAV flies; and performing the hypothetical test on the mean reflectivity spectrum of the first target and the mean reflectivity spectrum of the second target, and determining the hypothetical test result corresponding to the marked sample plot at the $i^{th}$ flight gradient.

According to a second aspect, the present disclosure provides a system for determining an optimal flight height of a UAV. The system includes a module for obtaining a multi-band crop spectral image of an experimental area, a module for determining a multi-spectral orthography of a sample plot, a module for determining a multi-spectral image of a sample plot at a different flight height, and an optimal flight height determining module.

The module for obtaining a multi-band crop spectral image of an experimental area is configured to obtain a multi-band crop spectral image of the experimental area in a preset scenario, where the preset scenario is a scenario in which flight parameters of the UAV and setting parameters of a spectral camera are unchanged in a flight process of the UAV carrying the spectral camera.

The module for determining a multi-spectral orthography of a sample plot is configured to perform data processing on the multi-band crop spectral image, to obtain multi-spectral orthographies of a plurality of sample plots, where the experimental area includes the plurality of sample plots.

The module for determining a multi-spectral image of a sample plot at a different flight height is configured to: calculate a ground resolution of the multi-spectral orthography of each sample plot, simulate and determine a multi-band crop spectral image of each sample plot at the different flight height by a nearest neighbor interpolation method based on the ground resolution of the multi-spectral orthography of each sample plot.

The optimal flight height determining module is configured to: for the multi-band crop spectral image of each sample plot at the different flight height, determine an optimal flight height corresponding to each sample plot by a hypothetical test method.

Optionally, according to the second aspect, the system further includes an optimal flight path determining module and a multi-band crop spectral image determining module.

The optimal flight path determining module is configured to determine an optimal flight path corresponding to the experimental area based on the optimal flight height corresponding to each sample plot.

The multi-band crop spectral image determining module is configured to control the UAV to fly based on the optimal flight path, to obtain a multi-band crop spectral image that meets a requirement for phenotypic parameter extraction accuracy.

Optionally, a plurality of multi-band crop spectral images corresponding to any sample plot are divided into different flight gradients based on a flight height. The optimal flight height determining module is specifically configured to:

for any sample plot, perform at least one hypothetical test operation based on a flight gradient from low to high until that a preset condition is met, where two hypothetical test operations correspond to the different flight gradients, an $i^{th}$ hypothetical test operation corresponds to an $i^{th}$ flight gradient, i is greater than or equal to 1 and less than or equal to N, and N is a total number of flight gradients.

The $i^{th}$ hypothetical test operation includes:

performing the hypothetical test on a multi-band crop spectral image of a marked sample plot at the $i^{th}$ flight gradient, and determining a hypothetical test result corresponding to the marked sample plot at the $i^{th}$ flight gradient, where the marked sample plot is any sample plot; and when the hypothetical test result is less than or equal to a preset threshold, determining a flight height corresponding to an $(i-1)^{th}$ flight gradient as an optimal flight height of the marked sample plot.

The preset condition includes that the hypothetical test result is less than or equal to the preset threshold.

According to a third aspect, the present disclosure provides a computer-readable storage medium. The computer-readable storage medium stores a computer program, and the computer program is executed by a processor to perform the method for determining an optimal flight height of a UAV according to the first aspect.

According to specific embodiments provided by the present disclosure, the present disclosure provides the following technical effects:

In view of the above problems in the prior art, an influence of the different flight heights on quality of the multi-band crop spectral image collected by the spectral camera carried by the UAV is mainly explored in the present disclosure. Firstly, the multi-band crop spectral image of the experimental area is obtained in the preset scenario, where the preset scenario is a scenario in which flight parameters of the UAV and setting parameters of a spectral camera are unchanged in the flight process of the UAV carrying the spectral camera. Secondly, data processing is performed on the multi-band crop spectral image, to obtain the multi-spectral orthographies of the sample plots. The ground resolution of the multi-spectral orthography of each sample plot is calculated, and the multi-band crop spectral image of each sample plot at the different flight height is simulated and determined by the nearest neighbor interpolation method based on the ground resolution of the multi-spectral orthography of each sample plot, to reduce influence factors of an external environment. Finally, the hypothetical test is performed for the multi-band crop spectral image of each sample plot at the different flight height, to verify whether there is a significant difference in the multi-band crop spectral image at the different flight height for phenotypic analysis, so that a relatively optimal flight height is obtained under conditions that a device carried by the UAV is fixed and other parameter settings are fixed, flight efficiency is improved, and time costs are reduced. Therefore, the optimal flight height is obtained based on the relationship between the flight height of the UAV and the ground resolution, and the foundation is laid for obtaining the crop spectral image that meets a requirement for phenotypic parameter extraction accuracy.

BRIEF DESCRIPTION OF THE DRAWINGS

To describe the technical solutions in embodiments of the present disclosure or in the prior art more clearly, the accompanying drawings required in embodiments are briefly described below. Apparently, the accompanying drawings in the following description show only some embodiments of the present disclosure, and other drawings can be derived from these accompanying drawings by those of ordinary skill in the art without creative efforts.

FIG. 1 is a schematic flowchart of a method for determining an optimal flight height of a UAV according to an embodiment of the present disclosure;

DETAILED DESCRIPTION OF THE EMBODIMENTS

Figure 2:
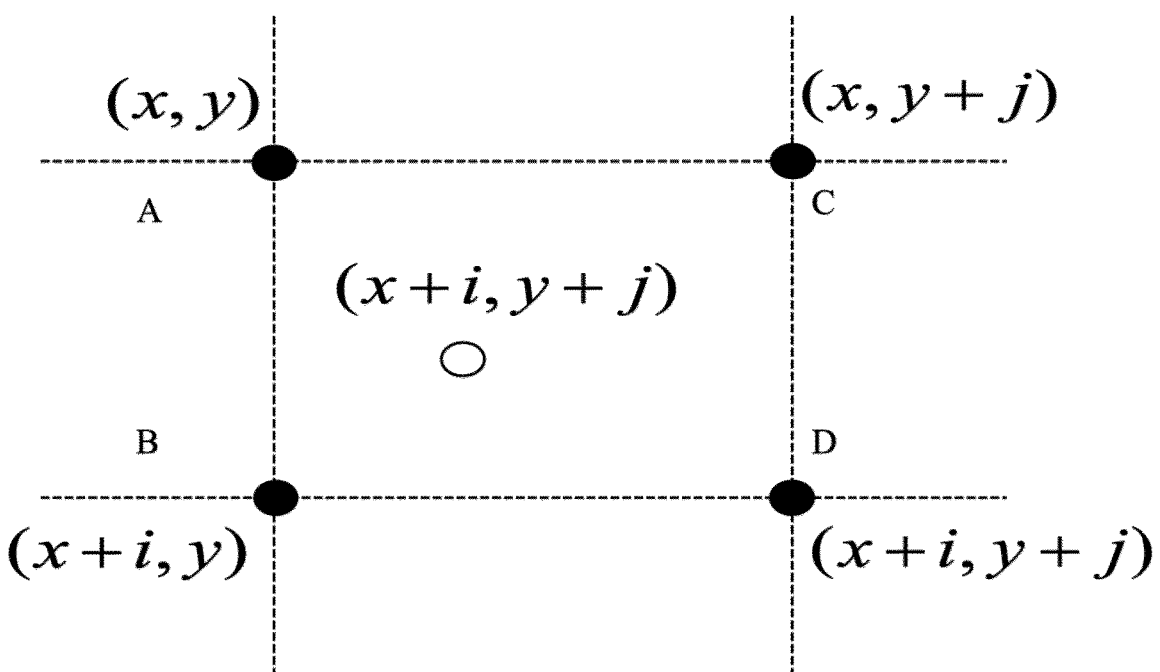
FIG. 2 is a position relationship diagram of mapping an interpolation point bask to an original image according to an embodiment of the present disclosure.

The technical solutions of embodiments of the present disclosure are clearly and completely described below with reference to the drawings. Apparently, the described embodiments are only a part rather than all of embodiments of the present disclosure. All other embodiments obtained by a person of ordinary skill in the art based on embodiments of the present disclosure without creative efforts shall fall within the protection scope of the present disclosure.

To make the above objectives, features, and advantages of the present disclosure clearer and more comprehensible, the present disclosure will be further described in detail below with reference to the accompanying drawings and the specific examples.

Embodiment 1

Referring to FIG. 1, a method for determining an optimal flight height of a UAV provided by the present disclosure includes the following steps.

Step 100: Obtain a multi-band crop spectral image of an experimental area in a preset scenario, where the preset scenario is a scenario in which flight parameters of the UAV and setting parameters of a spectral camera are unchanged in a flight process of the UAV carrying the spectral camera.

In an example, under conditions of cloudless and windless weather, a fixed flight speed (for example, 2.5 m/s), a fixed flight height (for example, 10 m), a fixed overlap rate (for example, 75%/60% for a fore-and-aft/lateral overlap rate, respectively), and fixed spectral camera parameters (exposure time, an iris, ISO, and a focal length), the multi-band crop spectral image of the experimental area is collected by using the spectral camera carried by the UAV.

Step 200: Perform data processing on the multi-band crop spectral image, to obtain multi-spectral orthographies of a plurality of sample plots, where the experimental area includes the plurality of sample plots.

Step 200 specifically includes:

Step A: Perform, by using Agisoft Photoscan software, image splicing on a multi-band crop spectral image of the experimental area collected by the spectral camera, to obtain the multi-spectral orthography.

Step A specifically includes image alignment, grid establishment, and image splicing.

Step B: Perform spectral correction and reflectivity correction on the multi-spectral orthography by using MATLAB software, to obtain a corrected multi-spectral orthography.

Step C: Perform image segmentation on the corrected multi-spectral orthography, to obtain the multi-spectral orthographies of the sample plots.

In an example, multi-spectral orthographies of 300 sample plots are obtained through the foregoing operations.

Step 300: Calculate a ground resolution of the multi-spectral orthography of each sample plot, simulate and determine a multi-band crop spectral image of each sample plot at a different flight height by a nearest neighbor interpolation method based on the ground resolution of the multi-spectral orthography of each sample plot.

The ground resolution is defined as an actual target length described by a unit pixel, and a calculation formula of the ground resolution is:

$$GSD = S \times H/f \tag{1},$$

where

GSD represents the ground resolution, S represents an actual size of the unit pixel of the spectral camera, H represents a flight height, and f represents a focal length of a lens of the spectral camera. When the flight height increases, the actual target length described by the unit pixel becomes longer, that is, the ground resolution decreases. This aggravates mixed pixel effect of the image.

The nearest neighbor interpolation method is a method to scale the image, and is also referred to as a zero-order interpolation method. A value of a pixel point to be interpolated is a value of a pixel point that is among four adjacent pixels around the pixel point to be interpolated and closest to the pixel point to be interpolated as shown in formula (2). Firstly, the point to be interpolated are mapped back to the original image, as shown in FIG. 2, and coordinates of the point to be interpolated are (x+i, y+j). Then, a distance between the point to be interpolated and the four adjacent pixels (A, B, C, D) each is calculated, and the pixel value of the point closest to the point to be interpolated is used as the pixel value of the point to be interpolated, to complete a nearest neighbor interpolation process.

$$h(x) = \begin{cases} 1, 0 \le |x| \le 0.5 \\ 0, \text{elsewhere} \end{cases} \tag{2}$$

The ground resolution of the multi-spectral orthography of each sample plot is changed by the nearest neighbor interpolation method, so that the ground resolution of the multi-spectral orthography of the sample plot is reduced. Then, a process of obtaining the multi-band crop spectral image of the sample plot by the UAV at the different flight height is simulated based on the different ground resolutions, to finally obtain the multi-band crop spectral image of the sample plot at the different flight height.

In an example, multi-band crop spectral images of 50 sample plots at the different flight heights are obtained through the foregoing operations.

The ground resolution of the multi-spectral orthography of the sample plot is changed by the nearest neighbor interpolation method, and the image photographed by the UAV at the different height is simulated, so that the ground resolution of the image is reduced. In comparison with a conventional outdoor experiment method, influence factors of an external environment are reduced, so that follow-up analysis is more accurate.

Step 400: For the multi-band crop spectral image of each sample plot at the different flight height, determine an optimal flight height corresponding to each sample plot by a hypothetical test method.

A calculation method of a mean reflectivity spectrum of the sample plot to calculate a mean reflectivity spectrum of the sample plots through a ground reflectivity correction plate and formula (3). A calculation formula of the reflectivity spectral is:

$$\frac{DN_n}{f_n} = \frac{DN_0}{f_0}, \quad \text{where} \tag{3}$$

DN represents an image gray value (Digital Number); $DN_0$ represents a mean image gray value of a known ground reflectivity correction plate; $f_0$ represents reflectivity of the known ground reflectivity correction plate, and the reflectivity of the known ground reflectivity correction plate is uniform; $DN_n$ represents an image gray value of each pixel of a single-band spectral image of an nth sample plot; and $f_n$ is reflectivity of each pixel of the single-band spectral image of the nth sample plot. All $f_n$ is averaged to obtain a mean reflectivity value of the sample plot. The foregoing operations are conducted on all bands to obtain the mean reflectivity spectrum of the sample plot.

Figure 3:
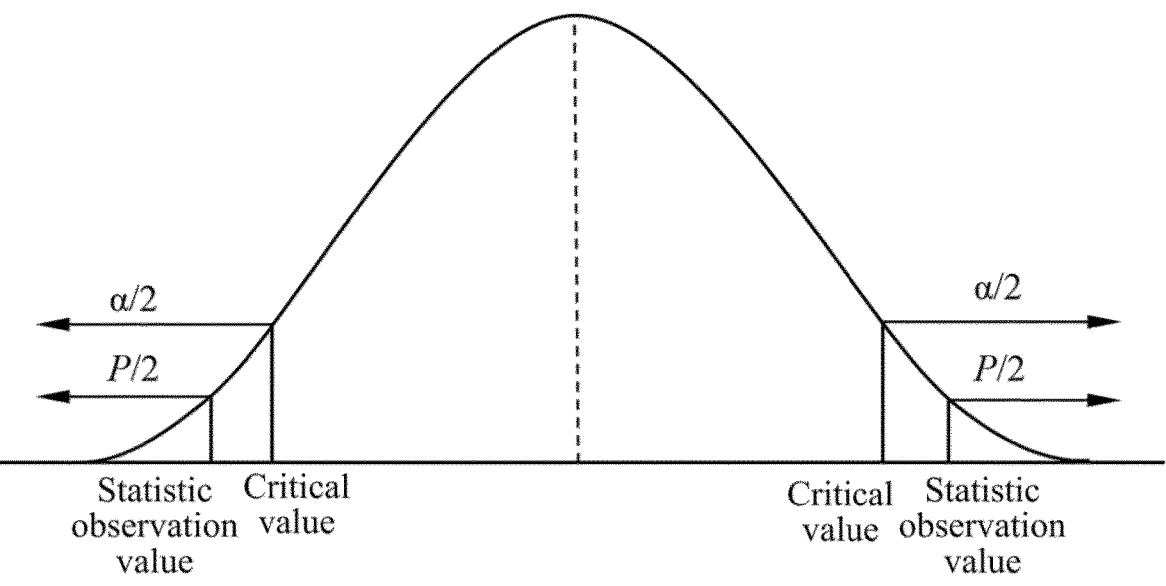
FIG. 3 is a schematic diagram of a p value and a significance level α for a two-sided test according to an embodiment of the present disclosure.

The hypothetical test method is to perform a hypothetical test on a mean reflectivity spectrum of 300 sample plots at 50 different flight heights and a mean reflectivity spectrum obtained from a flight test as shown in FIG. 3. If it is assumed that two samples are independent random samples and follow normal distribution, a confidence interval $(1-\alpha)$ is set to 0.95, and a significance level $(\alpha)$ is set to 0.05, p value is obtained by calculation. $p \leq 0.001$ indicates that there is an extremely significant statistical difference, $0.001 \leq p \leq 0.01$ indicates that there is a significant statistical difference, $0.01 \leq p \leq 0.05$ indicates that there is a statistical difference, and $0.05 \leq p$ indicates that there is no significant statistical difference. In this case, a multi-band spectral image obtained by the UAV from the flight test is true by default, and therefore, the flight height of the UAV is as low as possible in the flight test.

Based on this, step 400 specifically includes the following steps.

A plurality of multi-band crop spectral images corresponding to any sample plot are divided into different flight gradients based on the flight height.

For any sample plot, perform at least one hypothetical test operation based on a flight gradient from low to high until that a preset condition is met, where two hypothetical test operations correspond to the different flight gradients, an $i^{th}$ hypothetical test operation corresponds to an $i^{th}$ flight gradient, i is greater than or equal to 1 and less than or equal to N, and N is a total number of flight gradients.

The $i^{th}$ hypothetical test operation includes:

performing the hypothetical test on a multi-band crop spectral image of a marked sample plot at the $i^{th}$ flight gradient, and determining a hypothetical test result corresponding to the marked sample plot at the $i^{th}$ flight gradient, where the marked sample plot is any sample plot;

when the hypothetical test result is less than or equal to a preset threshold, determining a flight height corresponding to an $(i-1)^{th}$ flight gradient as an optimal flight height of the marked sample plot; and when the hypothetical test result is larger than the preset threshold, updating the $i^{th}$ flight gradient into an $(i+1)^{th}$ flight gradient, and returning to the step; performing the hypothetical test on a multi-band crop spectral image of a marked sample plot at the $i^{th}$ flight gradient, and determining a hypothetical test result corresponding to the marked sample plot at the $i^{th}$ flight gradient.

The preset condition includes that the hypothetical test result is less than or equal to the preset threshold.

The determining a hypothetical test result corresponding to the marked sample plot at the $i^{th}$ flight gradient specifically includes:

firstly, determining a mean reflectivity spectrum of a first target, wherein the mean reflectivity spectrum of the first target is a mean reflectivity spectrum of multi-band crop spectral images of marked sample plots at the $i^{th}$ flight gradient;

secondly, determining a mean reflectivity spectrum of a second target, wherein the mean reflectivity spectrum of the second target is a mean reflectivity spectrum of the multi-band crop spectral images of the marked sample plot when the UAV flies; and finally, performing the hypothetical test on the mean reflectivity spectrum of the first target and the mean reflectivity spectrum of the second target, and determining the hypothetical test result corresponding to the marked sample plot at the $i^{th}$ flight gradient.

In an example: Based on an order of increasing the flight height $(H_m, m=1, 2, \ldots, 50)$, the hypothetical test is performed on the mean reflectivity spectrum of the multi-band crop spectral images of the sample plot and the mean reflectivity spectrum obtained from a real flight test. When a hypothetical test result at an $H_m-1$ height is $p>0.05$ and a hypothetical test result at an $H_m$ height is $p \leq 0.05$, it indicates that there is a statistical difference between a mean reflectivity spectrum obtained at this height $(H_m)$ and above and a truthful mean reflectivity spectrum, and the mean reflectivity spectrum of the multi-band crop spectral image is error. Therefore, the UAV flies at a height lower than $H_m$ when carrying this spectral camera to obtain the image.

To improve flight efficiency, reduce flight costs, and obtain a correct spectral image, the optimal flight height is $H_{m-1}$.

The hypothetical test method is used to verify whether there is a significant difference in the mean spectrum at the different flight heights for phenotypic analysis, so as to obtain a relatively optimal flight height under conditions that a device carried by the UAV is fixed and other parameter settings are fixed. Conventionally, parameters are set by experience to perform a UAV test, and therefore, efficiency is low and costs are high. According to this embodiment of the present disclosure, the optimal flight height that is set under a condition of not damaging data accuracy improves the flight efficiency and reduces operation costs.

Further, the method provided by this embodiment further includes:

determining an optimal flight path corresponding to the experimental area based on the optimal flight height corresponding to each sample plot; and controlling the UAV to fly based on the optimal flight path, to obtain a multi-band crop spectral image that meets a requirement for phenotypic parameter extraction accuracy.

Embodiment 2

To perform the method in the embodiment 1 and achieve corresponding functions and technical effects, a method for determining an optimal flight height of a UAV is provided.

Figure 4:
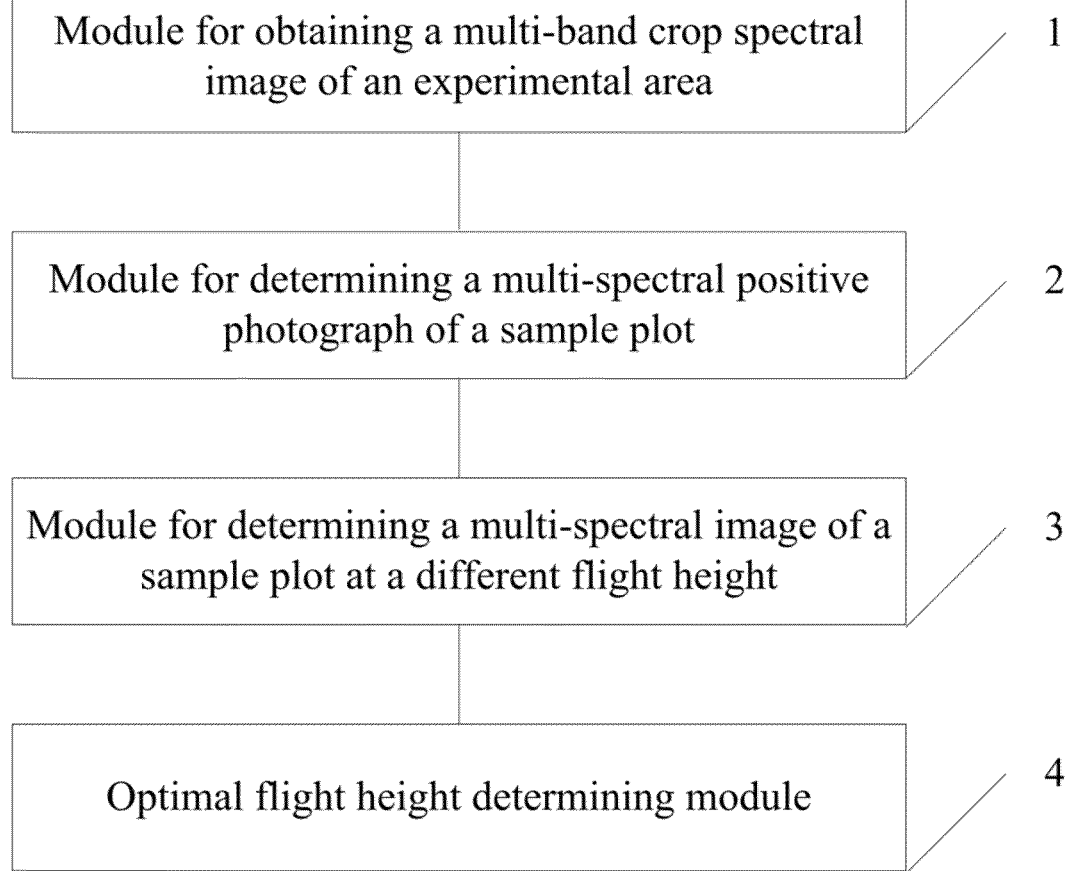
FIG. 4 is a schematic diagram of a structure of a system for determining an optimal flight height of a UAV according to an embodiment of the present disclosure.

Referring to FIG. 4, a system for determining an optimal flight height of a UAV provided by an embodiment of the present disclosure includes a module 1 for obtaining a multi-band crop spectral image of an experimental area, a module 2 for determining a multi-spectral orthography of a sample plot, a module 3 for determining a multi-spectral image of a sample plot at a different flight height, and an optimal flight height determining module 4.

The module 1 for obtaining a multi-band crop spectral image of an experimental area is configured to obtain a multi-band crop spectral image of the experimental area in a preset scenario, where the preset scenario is a scenario in which flight parameters of the UAV and setting parameters of a spectral camera are unchanged in a flight process of the UAV carrying the spectral camera.

The module 2 for determining a multi-spectral orthography of a sample plot is configured to perform data processing on the multi-band crop spectral image, to obtain multi-spectral orthographies of a plurality of sample plots, where the experimental area includes the plurality of sample plots.

The module 3 for determining a multi-spectral image of a sample plot at a different flight height is configured to: calculate a ground resolution of the multi-spectral orthography of each sample plot, simulate and determine a multi-band crop spectral image of each sample plot at the different flight height by a nearest neighbor interpolation method based on the ground resolution of the multi-spectral orthography of each sample plot.

The optimal flight height determining module 4 is configured to: for the multi-band crop spectral image of each sample plot at the different flight height, determine an optimal flight height corresponding to each sample plot by a hypothetical test method.

Further, the system provided by this embodiment further includes an optimal flight path determining module and a multi-band crop spectral image determining module.

The optimal flight path determining module is configured to determine an optimal flight path corresponding to the experimental area based on the optimal flight height corresponding to each sample plot.

The multi-band crop spectral image determining module is configured to control the UAV to fly based on the optimal flight path, to obtain a multi-band crop spectral image that meets a requirement for phenotypic parameter extraction accuracy.

Further, a plurality of multi-band crop spectral images corresponding to any sample plot are divided into different flight gradients based on the flight height.

The optimal flight height determining module 4 is specifically configured to:

for any sample plot, perform at least one hypothetical test operation based on a flight gradient from low to high until that a preset condition is met, where two hypothetical test operations correspond to the different flight gradients, an $i^{th}$ hypothetical test operation corresponds to an $i^{th}$ flight gradient, i is greater than or equal to 1 and less than or equal to N, and N is a total number of flight gradients.

The $i^{th}$ hypothetical test operation includes:

performing the hypothetical test on a multi-band crop spectral image of a marked sample plot at the $i^{th}$ flight gradient, and determining a hypothetical test result corresponding to the marked sample plot at the $i^{th}$ flight gradient, where the marked sample plot is any sample plot; and when the hypothetical test result is less than or equal to a preset threshold, determining a flight height corresponding to an $(i-1)^{th}$ flight gradient as an optimal flight height of the marked sample plot.

The preset condition includes that the hypothetical test result is less than or equal to the preset threshold.

Embodiment 3

An embodiment of the present disclosure further provides a computer-readable storage medium. The computer-readable storage medium stores a computer program, and the computer program is executed by the processor to perform the method for determining an optimal flight height of a UAV according to embodiment I.

Each embodiment of the present specification is described in a progressive manner, each embodiment focuses on the difference from other embodiments, and the same and similar parts between embodiments may refer to each other. Since the system disclosed in an embodiment corresponds to the method disclosed in another embodiment, the description is relatively simple, and reference can be made to the method description.

Specific examples are used herein to explain the principles and implementations of the present disclosure. The foregoing description of embodiments is only intended to help understand the method of the present disclosure and its core ideas; and besides, various modifications may be made by a person of ordinary skill in the art to specific embodiments and the scope of application in accordance with the ideas of the present disclosure. In conclusion, the content of the present specification shall not be construed as limitations to the present disclosure.

What is claimed is:

1. A method for controlling a flight height of an unmanned aerial vehicle (UAV), comprising:

obtaining a multi-band crop spectral image of an experimental area in a preset scenario, wherein the preset scenario is a scenario in which flight parameters of the UAV and setting parameters of a spectral camera are unchanged in a flight process of the UAV carrying the spectral camera;

performing data processing on the multi-band crop spectral image, to obtain multi-spectral orthographies of a plurality of sample plots, wherein the experimental area comprises the plurality of sample plots;

calculating a ground resolution of the multi-spectral orthography of each sample plot, simulating and determining a multi-band crop spectral image of each sample plot at a different flight height by a nearest neighbor interpolation method based on the ground resolution of the multi-spectral orthography of each sample plot;

for the multi-band crop spectral image of each sample plot at the different flight height, determining a flight height corresponding to each sample plot by a hypothetical test method;

determining a flight path corresponding to the experimental area based on the flight height corresponding to each sample plot; and controlling the UAV to fly based on the flight path to obtain a multi-band crop spectral image, wherein the multi-band crop spectral image meets a requirement of extraction accuracy of a phenotypic parameter;

wherein, a plurality of multi-band crop spectral images corresponding to any sample plot are divided into different flight gradients based on a flight height;

for the multi-band crop spectral image of each sample plot at the different flight height, the controlling a flight height corresponding to each sample plot by a hypothetical test method comprises:

for any sample plot, performing at least one hypothetical test operation based on a flight gradient from low to high until that a preset condition is met, wherein two hypothetical test operations correspond to the different flight gradients, an $i^{th}$ hypothetical test operation corresponds to an $i^{th}$ flight gradient, i is greater than or equal to 1 and less than or equal to N, and N is a total number of flight gradients:

the $i^{th}$ hypothetical test operation comprises:

performing the hypothetical test on a multi-band crop spectral image of a marked sample plot at the $i^{th}$ flight gradient, and determining a hypothetical test result corresponding to the marked sample plot at the $i^{th}$ flight gradient, wherein the marked sample plot is any sample plot; and when the hypothetical test result is less than or equal to a preset threshold, determining a flight height corresponding to an $(i-1)^{th}$ flight gradient as a flight height of the marked sample plot;

wherein, the preset condition comprises that the hypothetical test result is less than or equal to the preset threshold.

2. The method for controlling a flight height of a UAV according to claim 1, wherein the performing data processing on the multi-band crop spectral image, to obtain multi-spectral orthographies of a plurality of sample plots specifically comprises:

performing image splicing on a multi-band crop spectral image of the experimental area collected by the spectral camera, to obtain the multi-spectral orthography;

performing spectral correction and reflectivity correction on the multi-spectral orthography to obtain a corrected multi-spectral orthography; and performing image segmentation on the corrected multi-spectral orthography, to obtain the multi-spectral orthographies of the sample plots.

3. The method for controlling a flight height of a UAV according to claim 1, wherein the determining a hypothetical test result corresponding to the marked sample plot at the $i^{th}$ flight gradient specifically comprises:

determining a mean reflectivity spectrum of a first target, wherein the mean reflectivity spectrum of the first target is a mean reflectivity spectrum of multi-band crop spectral images of marked sample plots at the $i^{th}$ flight gradient;

determining a mean reflectivity spectrum of a second target, wherein the mean reflectivity spectrum of the second target is a mean reflectivity spectrum of the multi-band crop spectral images of the marked sample plot when the UAV flies; and performing the hypothetical test on the mean reflectivity spectrum of the first target and the mean reflectivity spectrum of the second target, and determining the hypothetical test result corresponding to the marked sample plot at the $i^{th}$ flight gradient.

4. A system for controlling a flight height of a UAV, comprising:

a module for obtaining a multi-band crop spectral image of an experimental area, configured to obtain a multi-band crop spectral image of the experimental area in a preset scenario, wherein the preset scenario is a scenario in which flight parameters of the UAV and setting parameters of a spectral camera are unchanged in a flight process of the UAV carrying the spectral camera;

a module for determining a multi-spectral orthography of a sample plot, configured to perform data processing on the multi-band crop spectral image, to obtain multi-spectral orthographies of a plurality of sample plots, wherein the experimental area comprises the plurality of sample plots;

a module for determining a multi-spectral image of a sample plot at a different flight height, configured to: calculate a ground resolution of the multi-spectral orthography of each sample plot, simulate and determine a multi-band crop spectral image of each sample plot at the different flight height by a nearest neighbor interpolation method based on the ground resolution of the multi-spectral orthography of each sample plot;

a flight height determining module, configured to: determine a flight path corresponding to the experimental area based on the flight height corresponding to each sample plot and, for the multi-band crop spectral image of each sample plot at the different flight height, determine a flight height corresponding to each sample plot by a hypothetical test method; and a multi-band crop spectral image determining module, configured to control the UAV to fly based on the flight path to obtain a multi-band crop spectral image, wherein the multi-band crop spectral image meets a requirement of extraction accuracy of a phenotypic parameter:

wherein a plurality of multi-band crop spectral images corresponding to any sample plot are divided into different flight gradients based on a flight height;

the flight height determining module is specifically configured to:

for any sample plot, perform at least one hypothetical test operation based on a flight gradient from low to high until that a preset condition is met, wherein two hypothetical test operations correspond to the different flight gradients, an $i^{th}$ hypothetical test operation corresponds to an $i^{th}$ flight gradient, i is greater than or equal to 1 and less than or equal to N, and N is a total number of flight gradients;

the $i^{th}$ hypothetical test operation comprises:

performing the hypothetical test on a multi-band crop spectral image of a marked sample plot at the $i^{th}$ flight gradient, and determining a hypothetical test result corresponding to the marked sample plot at the $i^{th}$ flight gradient, wherein the marked sample plot is any sample plot; and when the hypothetical test result is less than or equal to a preset threshold, determining a flight height corresponding to an $(i-1)^{th}$ flight gradient as a flight height of the marked sample plot;

wherein, the preset condition comprises that the hypothetical test result is less than or equal to the preset threshold.

5. An electronic device, comprising a non-transitory memory arrangement, and a processor, wherein the non-transitory memory arrangement is configured to store a computer program, and the processor is configured to run the computer program to enable the electronic device to perform the following steps:

obtaining a multi-band crop spectral image of an experimental area in a preset scenario, wherein the preset scenario is a scenario in which flight parameters of the UAV and setting parameters of a spectral camera are unchanged in a flight process of the UAV carrying the spectral camera;

performing data processing on the multi-band crop spectral image, to obtain multi-spectral orthographies of a plurality of sample plots, wherein the experimental area comprises the plurality of sample plots;

calculating a ground resolution of the multi-spectral orthography of each sample plot, simulating and determining a multi-band crop spectral image of each sample plot at a different flight height by a nearest neighbor interpolation method based on the ground resolution of the multi-spectral orthography of each sample plot;

for the multi-band crop spectral image of each sample plot at the different flight height, determining a flight height corresponding to each sample plot by a hypothetical test method;

determining a flight path corresponding to the experimental area based on the flight height corresponding to each sample plot; and controlling the UAV to fly based on the flight path to obtain a multi-band crop spectral image, wherein the multi-band crop spectral image meets a requirement of extraction accuracy of a phenotypic parameter;

wherein, a plurality of multi-band crop spectral images corresponding to any sample plot are divided into different flight gradients based on a flight height;

for the multi-band crop spectral image of each sample plot at the different flight height, the determining a flight height corresponding to each sample plot by a hypothetical test method comprises:

for any sample plot, performing at least one hypothetical test operation based on a flight gradient from low to high until that a preset condition is met, wherein two hypothetical test operations correspond to the different flight gradients, an $i^{th}$ hypothetical test operation corresponds to an $i^{th}$ flight gradient, i is greater than or equal to 1 and less than or equal to N, and N is a total number of flight gradients;

the $i^{th}$ hypothetical test operation comprises:

performing the hypothetical test on a multi-band crop spectral image of a marked sample plot at the $i^{th}$ flight gradient, and determining a hypothetical test result corresponding to the marked sample plot at the $i^{th}$ flight gradient, wherein the marked sample plot is any sample plot; and when the hypothetical test result is less than or equal to a preset threshold, determining a flight height corresponding to an $(i-1)^{th}$ flight gradient as a flight height of the marked sample plot;

wherein, the preset condition comprises that the hypothetical test result is less than or equal to the preset threshold.

6. The electronic device according to claim 5, wherein the performing data processing on the multi-band crop spectral image, to obtain multi-spectral orthographies of a plurality of sample plots specifically comprises:

performing image splicing on a multi-band crop spectral image of the experimental area collected by the spectral camera, to obtain the multi-spectral orthography;

performing spectral correction and reflectivity correction on the multi-spectral orthography to obtain a corrected multi-spectral orthography; and performing image segmentation on the corrected multi-spectral orthography, to obtain the multi-spectral orthographies of the sample plots.

7. The electronic device according to claim 5, wherein the determining a hypothetical test result corresponding to the marked sample plot at the $i^{th}$ flight gradient specifically comprises:

determining a mean reflectivity spectrum of a first target, wherein the mean reflectivity spectrum of the first target is a mean reflectivity spectrum of multi-band crop spectral images of marked sample plots at the $i^{th}$ flight gradient;

determining a mean reflectivity spectrum of a second target, wherein the mean reflectivity spectrum of the second target is a mean reflectivity spectrum of the multi-band crop spectral images of the marked sample plot when the UAV flies; and performing the hypothetical test on the mean reflectivity spectrum of the first target and the mean reflectivity spectrum of the second target, and determining the hypothetical test result corresponding to the marked sample plot at the $i^{th}$ flight gradient.

* * * * *